(12) United States Patent
Jang et al.

(10) Patent No.: US 6,593,736 B1
(45) Date of Patent: Jul. 15, 2003

(54) METHOD AND APPARATUS STABILIZING THE MAGNETIC DOMAIN OF MERGED MAGNETORESISTIVE READ-WRITE HEADS USING DC WRITE CURRENT AND READ BIAS CURRENT

(76) Inventors: Eun Kyu Jang, 75 W. Plumeria Dr., San Jose, CA (US) 95134; Hyung Jai Lee, 75 W. Plumeria Dr., San Jose, CA (US) 95134

( * ) Notice: Subject to any disclaimer, the term of this patent is extended or adjusted under 35 U.S.C. 154(b) by 0 days.

(21) Appl. No.: 10/074,614

(22) Filed: Feb. 11, 2002

(51) Int. Cl.[7] .................... G01R 33/12; G11B 5/39; G11B 5/455

(52) U.S. Cl. ................. 324/210; 29/603.08; 29/603.09; 360/317

(58) Field of Search ................... 324/210, 212, 324/252, 537; 360/6, 31, 317–318.1; 29/603.08, 603.09; 148/108

(56) References Cited

U.S. PATENT DOCUMENTS

| | | | | |
|---|---|---|---|---|
| 5,589,777 A | * | 12/1996 | Davis et al. ............ | 324/210 X |
| 6,249,394 B1 | * | 6/2001 | Li et al. ................. | 360/31 |
| 6,340,885 B1 | * | 1/2002 | Hachisuka et al. ......... | 324/210 |

* cited by examiner

Primary Examiner—Gerard R. Strecker
(74) Attorney, Agent, or Firm—Gregory Smith & Associates; Earle Jennings; Jeffrey P. Aiello

(57) ABSTRACT

The invention includes a method and apparatus repairing read heads of a merged magnetoresistive read-write head without the use of external magnets nor the exclusive use of read bias current to heat the read head.

29 Claims, 11 Drawing Sheets

METHOD AND APPARATUS STABILIZING THE MAGNETIC DOMAIN OF MERGED MAGNETORESISTIVE READ-WRITE HEADS USING DC WRITE CURRENT AND READ BIAS CURRENT

TECHNICAL FIELD

This invention relates to magnetic domain stabilization of the read head of a merged type magneto-resistive head for a disk drive, including GMR (Giant Magneto-Resistive) read-write heads.

BACKGROUND ART

Disk drives are an important data storage technology. One of the crucial components of a disk drive are the read-write heads, which directly communicate with a disk surface containing the data storage medium. This invention corrects Electro-Static Discharge (ESD) damage to the pinned layer of the read head by the use of a write current applied to the write inductive coil and the use of a read current bias applied to the read head. The invention also corrects unstable read write heads, reducing base line popping.

FIG. 1A illustrates a typical prior art high capacity disk drive 10 including actuator arm 30 with voice coil 32, actuator axis 40, suspension of head arm 50 with slider/head unit 60 moving over disk surface 12.

FIG. 1B illustrates a typical prior art high capacity disk drive 10 with actuator 20 including actuator arm 30 with voice coil 32, actuator axis 40, head arms 50–54 and slider/head units 60–66 with the disks removed.

Since the 1980's, high capacity disk drives 10 have used voice coil actuators including 20–66 to position their read-write heads over specific tracks. The heads are mounted on head sliders 60–66, which are included in a voice coil actuator and float a small distance off the disk drive surface 12 when in operation. Often there is one head per head slider for a given disk drive surface. There are usually multiple heads in a single disk drive, but for economic reasons, usually only one voice coil actuator.

Voice coil actuators are further composed of a fixed magnet actuator 20 interacting with a time varying electromagnetic field induced by voice coil 32 to provide a lever action via actuator axis 40. The lever action acts to move head arms 50–56 positioning head slider units 60–66 over specific tracks with speed and accuracy. Actuator arms 30 are often considered to include voice coil 32, actuator axis 40, head arms 50-56 and head sliders 60–66. Note that actuator arms 30 may have as few as a single head arm 50. Note also that a single head arm 52 may connect with two head sliders 62 and 64.

Merged type heads possess different components for reading and writing, because the magneto-resistive effect only occurs during reading. A merged type head typically includes a thin film head and a spin valve sensor. The primary use of the thin film head is in the write process. The spin valve sensor is used for reading.

Merged Magneto-Resistive (MR) heads have several advantages over earlier approaches, using a single component, for both read and write. Earlier read-write heads were a study in tradeoffs. The single component, often a ferrite core, can increase read sensitivity with additional windings around the core. However, these added windings make the ferrite core write less efficiently.

Introduced in the 1990's, merged heads brought significant increases in areal density. A merged type head reads the disk surface using a spin valve, containing a conductive thin film, whose resistance changes in the presence of a magnetic field. By separating the functions of writing and reading, each function can be optimized further than would be possible for the older read-write heads. For all the improvement that merged heads bring, there remain problems. However, before discussing these problems, consider first how and what controls these devices in contemporary disk drives.

FIG. 2A illustrates a simplified schematic of a disk drive controller 1000 controlling an analog read-write interface 220, write differential signal pair (w+ and w−), and the read differential signal pair (r+ and r−) communicating resistivity found in the spin valve within MR read-write head 200 of the prior art.

Note that usually the resistance of the read head is determined by measuring the voltage drop (V_rd) across the read differential signal pair (r+ and r−) based upon the read bias current setting Ir_set, using Ohm's Law.

As illustrated in FIG. 2A, embedded disk controller 1000 includes computer 1100 accessibly coupled 1122 with memory 1120. Memory 1120 includes program system 1128. Embedded disk controller 1000 asserts Ir_set and Iw_set, both of which are presented to analog read/write interface 220. Iw_set is used by analog read/write interface 220 is control the write current presented to the write differential signal pair w+ and w−.

FIG. 2B illustrates a suspended head slider 60 containing the MR read-write head 200 of the prior art.

FIG. 2C illustrates a perspective view of merged read-write head 200 from FIG. 2B including write inductive head 202 and magnetoresistive read head (or spin valve) 204 of the prior art.

FIG. 2D illustrates a simplified cross section view of spin valve 204 with a region 206 composed of multiple layers forming the active region of spin valve 204 of FIG. 2C of the prior art.

FIG. 2E illustrates a more detailed cross section view of region 206 of FIG. 2D. a typical GMR spin valve of the prior art.

Region 206 contains Anti-FerroMagnetic (AFM) exchange film 208 deposited on pinned Ferro-Magnetic (FM) layer 210, over a copper (Cu) spacer layer 212 in turn deposited over free layer 214 on top of under layer 216 as typically found in a GMR spin valve of the prior art.

A GMR sensor is usually fabricated as follows: AFM layer 208 primarily composed of PtMn (Platinum Manganese). Pinned FM layer 210 is primarily composed of Co (Cobalt) NiFe (permalloy). The free layer 214 is primarily composed of NiFe permalloy. Under layer 216 is often composed primarily of Tantalum (Ta).

There is a distribution blocking temperature between layers 208 and 210. When the temperature of spin valve 204 exceeds the distribution blocking temperature, the exchange coupling between AFM layer 208 and FM pinned layer 210 vanishes.

During the manufacture and handling of spin valve 204, the magnetization of pinned layer (FM layer 210) may be reversed or rotated by 180 degrees due to an ESD event. The magnetization of the free layer may also be altered by an ESD event.

Note that the entire spin valve 204 is vertically located between shields S1 and S2 of FIG. 2C as will be illustrated in FIGS. 3A and 3B.

FIG. 2F illustrates normal magnetization of a spin valve read head as well as magnetization damage from ESD events as known in the prior art.

The AFM layer 208 will typically have a magnetization direction 300. Pinned layer 210 will normally have magnetization direction 310, but after one or more ESD events, may have a magnetization direction such as indicated by 312 or 314. The Cu spacer layer 212 is not specifically relevant in this discussion and is not illustrated here. Free layer 214 normally has a magnetization direction 320 and after damage from one or more ESD events, may have an altered magnetization direction as indicated by 322.

Normally, AFM layer 208 and pinned layer 210 have essentially parallel magnetization directions and free layer 214 is magnetized essentially perpendicular to layers 208 and 210. Operation of the spin valve read head 204 depends upon these directional relationships.

FIGS. 3A and 3B illustrate the magnetic flux direction related to the charging of the write differential signal pair connecting to P1 and P2, the poles of the write head, of the prior art.

FIG. 3A illustrates the magnetic flux D1 flowing from P1 to P2, when there is a positive write current asserted on the write differential signal pair under normal conditions in the prior art.

FIG. 3B illustrates the magnetic flux D2 flowing from P2 to P1, when there is a negative write current asserted on the write differential signal pair under normal conditions in the prior art.

Electro-Static Discharge (ESD) can diminish or damage the pinning part of the spin valve head 204 creating a weakened or reversed magnetic condition as discussed in FIG. 2F. Such conditions damage or destroy the ability of the spin valve 204, thus the MR read-write head 200 to function.

FIG. 4A depicts the ideal voltage amplitude measured across the read differential signal pair sensing a written pulse on a disk drive surface in the prior art.

As used in the prior art, the amplitude is defined as $v_+ + v_-$. Asymmetry is defined as $v_+ - v_-$. The ideal situation would have a ratio of asymmetry to amplitude of 0%, but acceptable ranges are often 5% to 10%, with 7% being typical for a spin valve. ESD tends to decrease the amplitude and increase the asymmetry.

FIG. 4B illustrates base line popping, a condition often adversely affecting the quality of a spin valve and resulting from certain unstable read-write heads as known in the prior art.

Base line popping can lead to false detection of peaks (1) and troughs (0) as illustrated in FIG. 4B.

The prior art teaches repairing ESD damaged and unstable read heads by raising the read head temperature above the blocking temperature and generating a magnetic field across the read head. The prior art teaches applying a high read bias current to heat the read head, often using more than 10 mA, which may melt the read head. Sometimes an external magnetic field is used, requiring an external magnet, its power supply, and mechanical infrastructure positioning the external magnet with respect to the mechanical housing of the read-write head.

The prior art approach to repairing ESD damaged and unstable read heads has both reliability and cost problems associated with it. The external magnet and its requirements add to the cost of repair and thus, manufacture.

To summarize, what is needed are repair circuits and methods reducing the cost and improving the reliability of repairing and thus manufacturing MR read-write heads, and products containing these read-write heads (head sliders, actuator arms, voice coil actuators and disk drives).

SUMMARY OF THE INVENTION

The invention includes a method and apparatus repairing read heads of merged magnetoresistive read-write heads without the use of external magnets nor the heating the read head exclusively using the read bias current. The invention addresses at least the problems found in the prior art approaches.

The invention includes a write current source applying a write current level onto the write differential signal pair causing the write head to induce a temperature rise in the read head. A magnetic field within the read head is created by read current source applying a read current level onto the read differential signal pair. The read current and write current are maintained for at least a time period to effect repair.

By not requiring an external magnet, the invention costs less than any prior art approach, as well as protecting the read head from melting.

Because there is no external magnet required and current levels are within normal tolerances, the invention may be used to repair ESD damaged read heads in an assembled disk drive.

These and other advantages of the present invention will become apparent upon reading the following detailed descriptions and studying the various figures of the drawings.

DETAILED DESCRIPTION OF THE INVENTION

The invention includes a method and apparatus repairing read heads of merged magnetoresistive read-write heads without the use of external magnets nor the use of high read bias current to heat the read head. The invention addresses at least the problems found in the prior art approaches. The system diagram of FIG. 5 illustrates an apparatus capable of implementing the repair method.

Figure 1A:
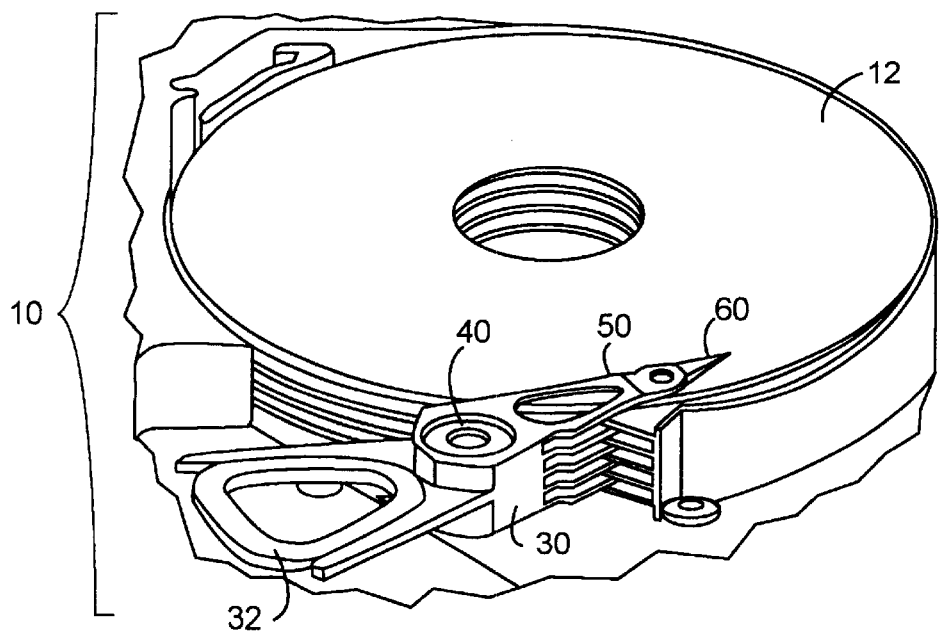
FIG. 1A illustrates a typical prior art high capacity disk drive 10 including actuator arm 30 with voice coil 32, actuator axis 40, suspension of head arm 50 with slider/head unit 60 moving over disk surface 12.
Figure 1B:
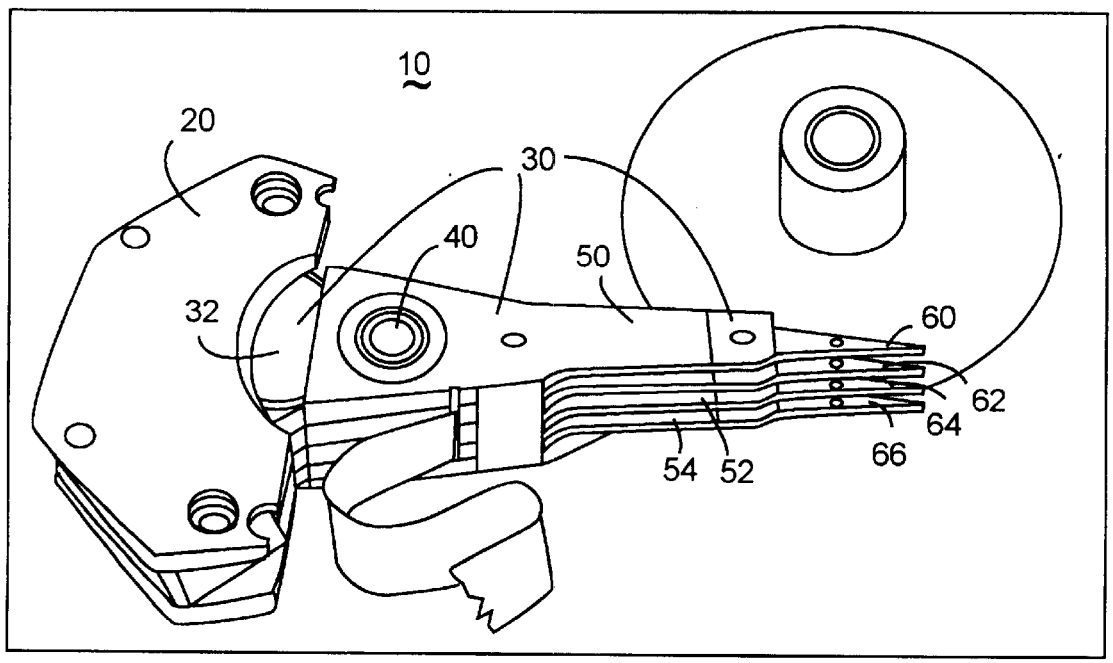
FIG. 1B illustrates a typical prior art high capacity disk drive 10 with actuator 20 including actuator arm 30 with voice coil 32, actuator axis 40, head arms 50–54 and slider/head units 60–66 with the disks removed.
Figure 2A:
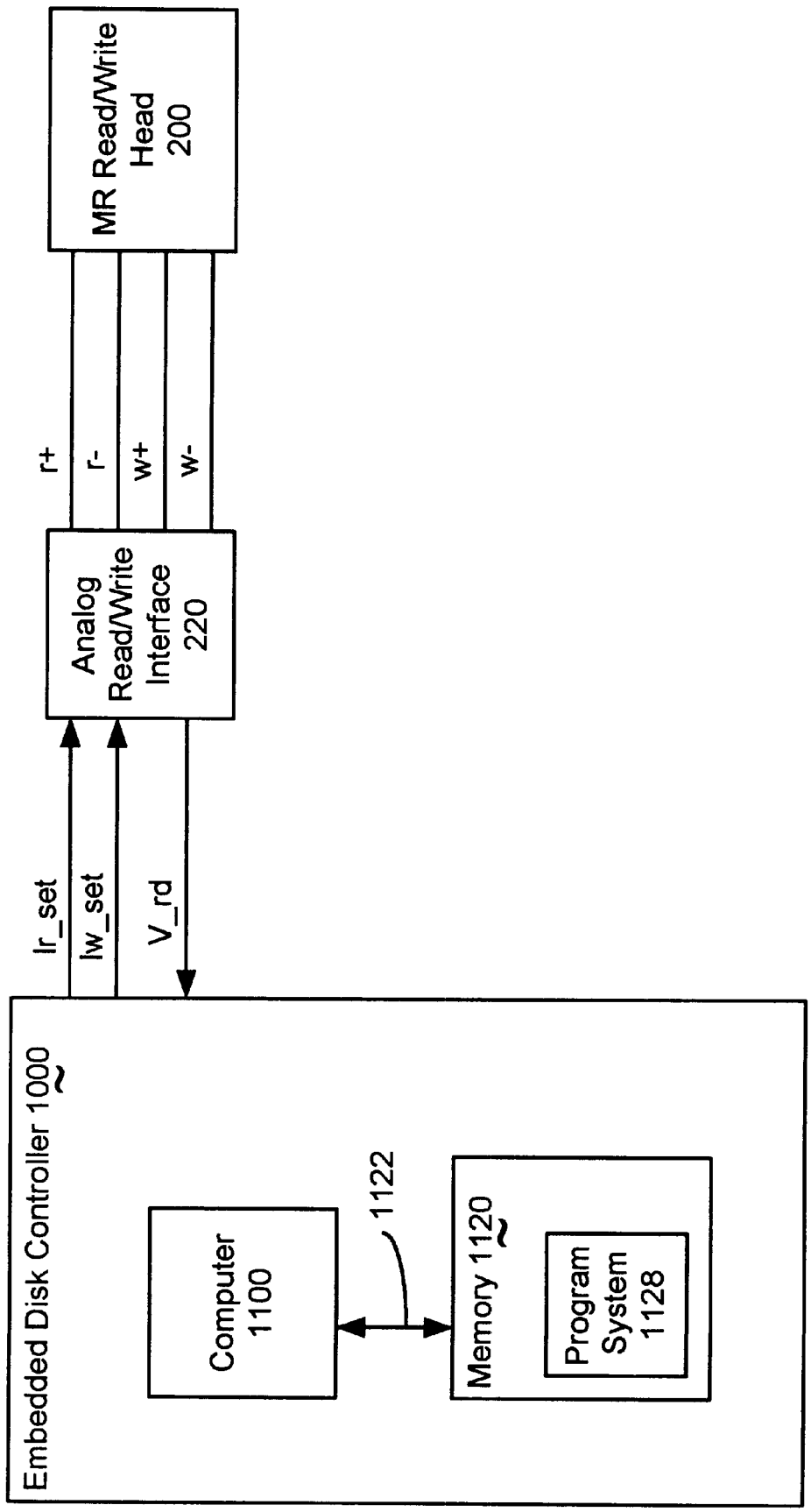
FIG. 2A illustrates a simplified schematic of a disk drive controller 1000 controlling an analog read/write interface 220, the read differential signal pair (r+ and r−) and write differential signal pair (w+ and w−) communicating the resistivity found in the spin valve within MR read/write head 200 of the prior art.
Figure 2B:
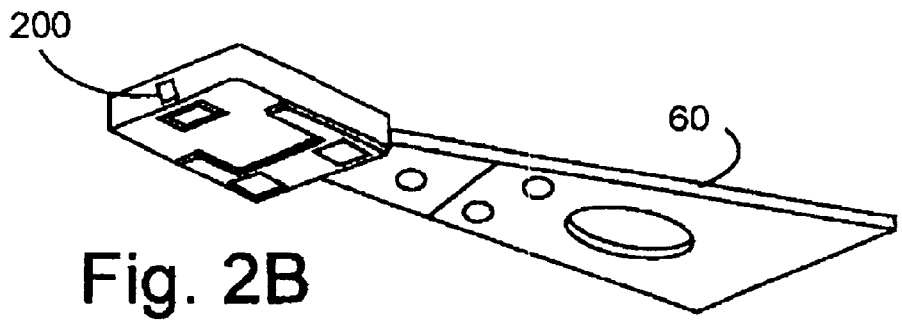
FIG. 2B illustrates a suspended head slider 60 containing the MR read-write head 200 of the prior art.
Figure 2C:
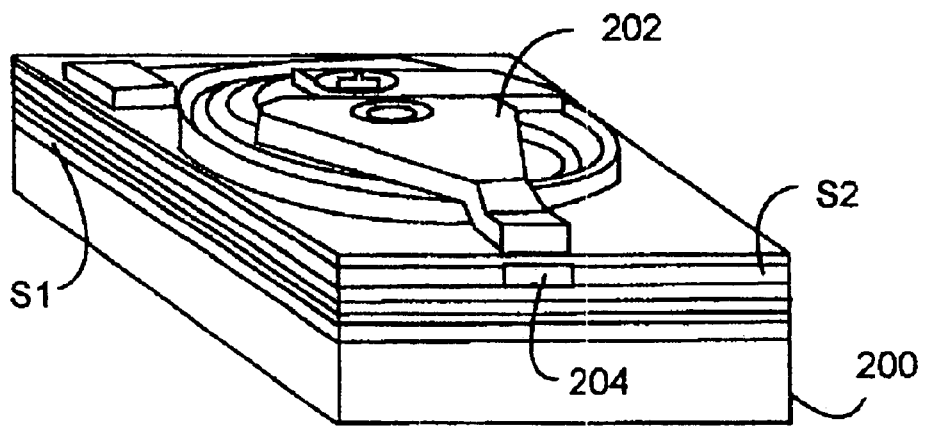
FIG. 2C illustrates a perspective view of merged read-write head 200 from FIG. 2B including write inductive head 202 and magnetoresistive read head (or spin valve) 204 of the prior art.
Figure 2D:
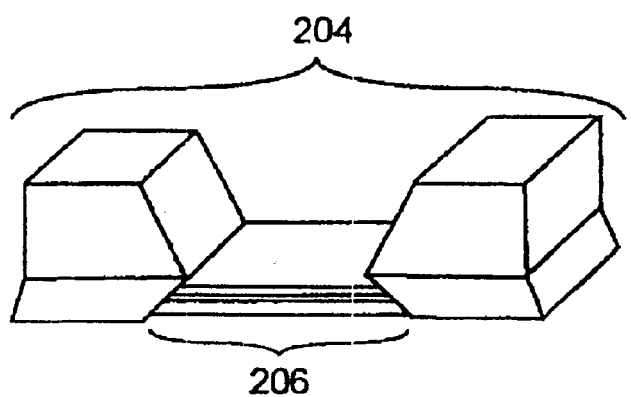
FIG. 2D illustrates a simplified cross section view of spin valve 204 of FIG. 2C of the prior art.
Figure 2E:
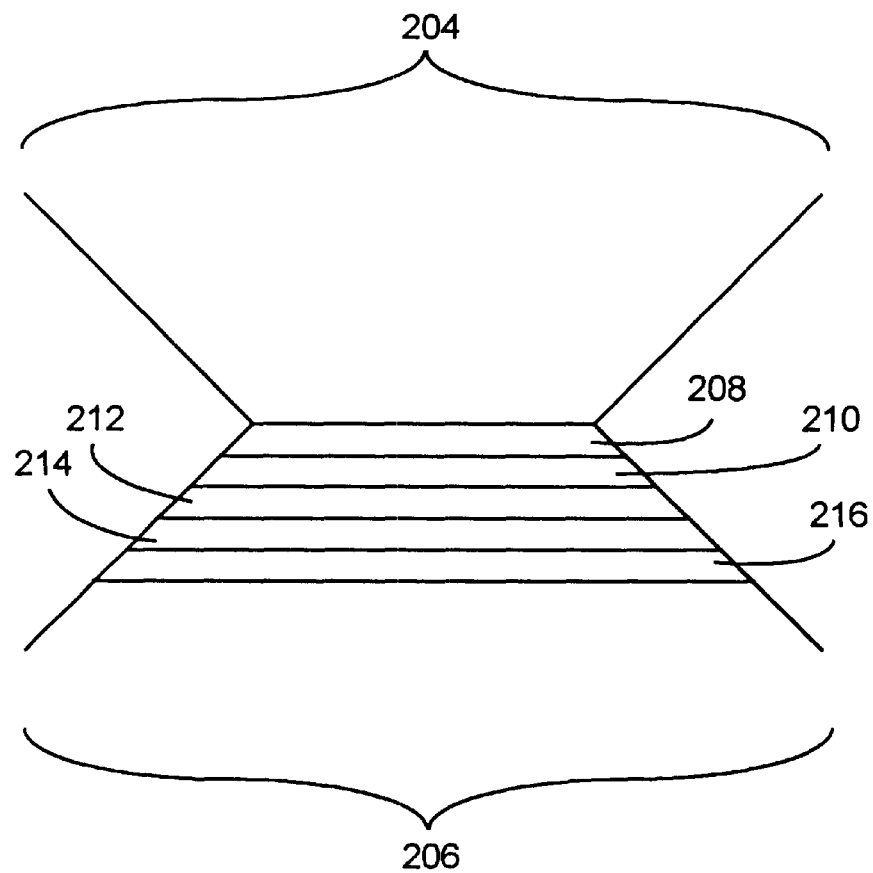
FIG. 2E illustrates a more detailed cross section view of region 206 of FIG. 2D, a typical GMR spin valve of the prior art.
Figure 2F:
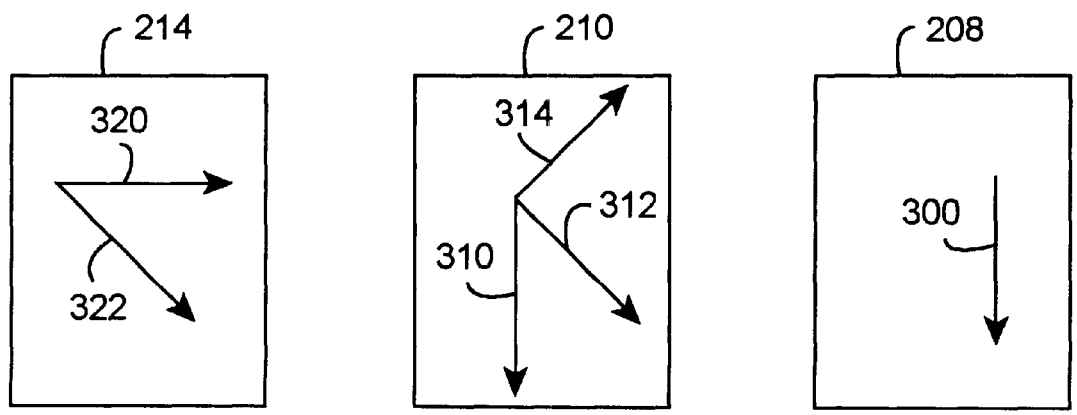
FIG. 2F illustrates normal magnetization of a spin valve read head as well as magnetization damage from ESD events as known in the prior art.
Figure 3A:
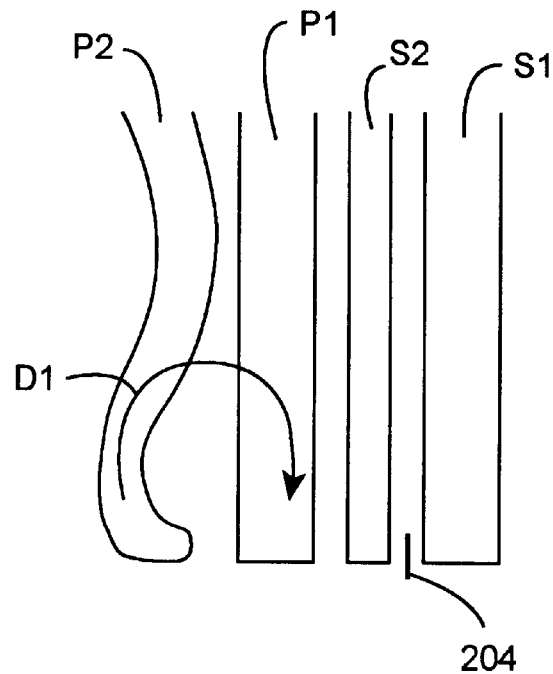
FIGS. 3A and 3B illustrate the magnetic flux direction related to the charging of the write differential signal pair connecting to P1 and P2 of the prior art.
Figure 3B:
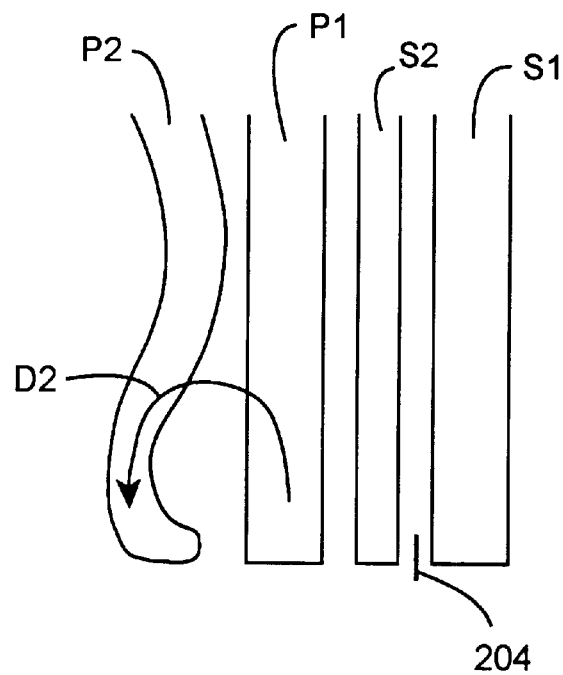
Figure 4A:
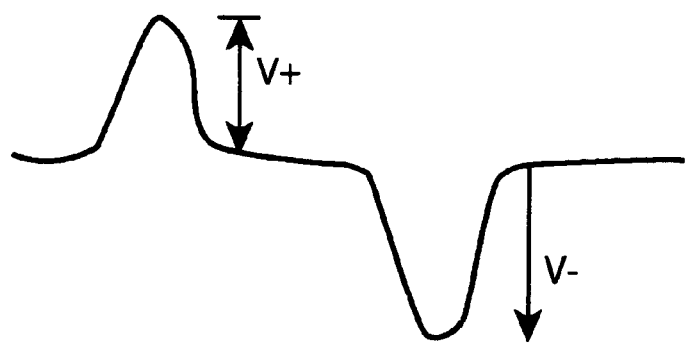
FIG. 4A depicts the voltage amplitude measured across the read differential signal pair sensing a written pulse on a disk drive surface in the prior art.
Figure 4B:
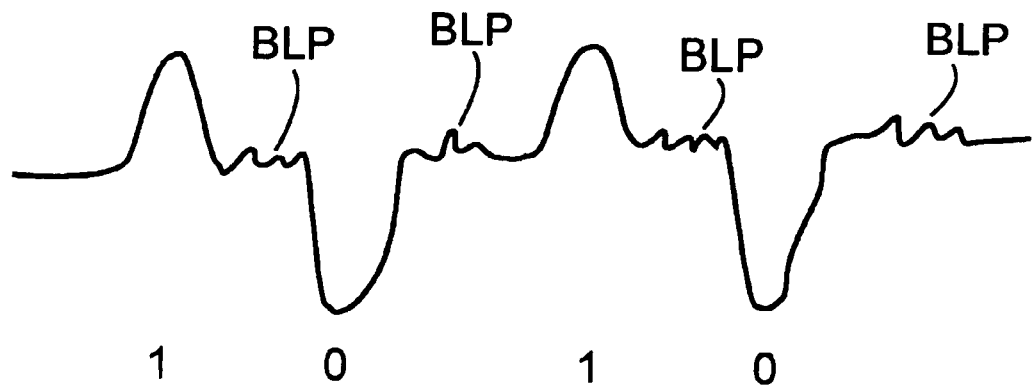
FIG. 4B illustrates base line popping, a condition often adversely affecting the quality of a spin valve and resulting from certain ESD discharge events as known in the prior art.
Figure 5:
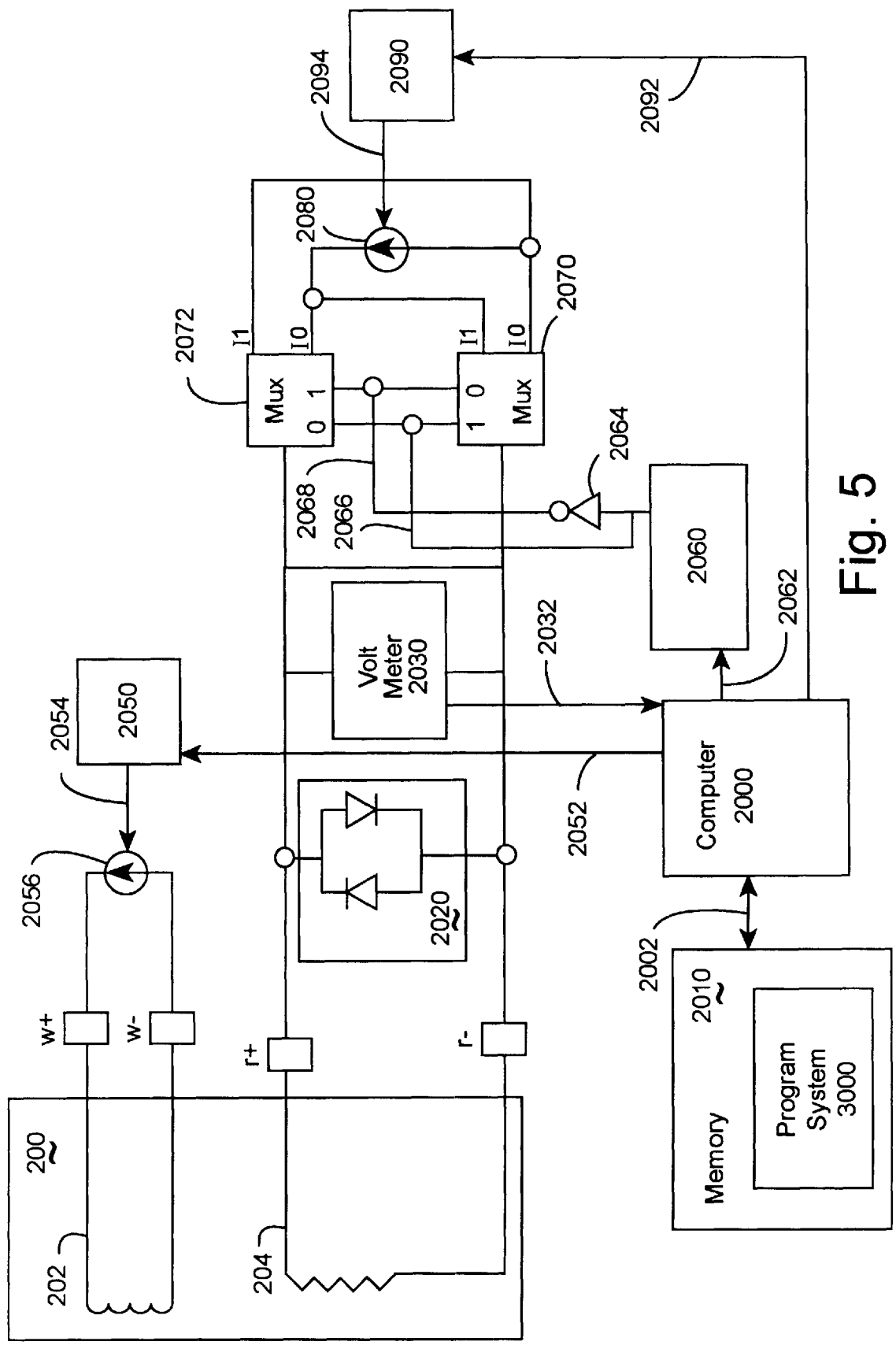
FIG. 5 illustrates a system determining performance of a merged magnetoresistive read-write head 200 to select a passed read-write head.

FIG. 5 illustrates a system determining performance of a merged magnetoresistive read-write head 200 to select a passed read-write head.

Write current source 2050 drives write differential signal pair w+ and w− of merged magnetoresistive read-write head 200 at a write current level controlling a magnetic field produced by write head 202 to induce a temperature rise in a read head 204.

Read current source 2080 drives a read differential signal pair of merged magnetoresistive read-write head 200 at a read current level to create a magnetic field within read head 204.

As illustrated in FIG. 5, read/write head 200 includes write head 202 powered by differential write signal pair w+ and w−, as well as read head 204 powered by differential read signal pair r+ and r−. Differential write signal pair w+ and w− are coupled to and driven by write current source 2056, which is controlled 2054 by digital to analog interface 2050. Digital to analog interface 2050 is controlled 2052 by computer, 2000.

As illustrated in FIG. 5, read signal pair r+ and r− are coupled to not only read head 204, but also ESD protection circuit 2020, volt meter 2030, and a network including muxes 2070 and 2072.

As illustrated in FIG. 5, each of Muxes 2070 and 2072 has a port on the left side coupled to the read signal pair r+ and r−. Each of Muxes 2070 and 2072 has two ports on the right side, which are coupled to read current source 2080. Each of Muxes 2070 and 2072 has two ports labeled '0' and '1'. Signal 2066 is a digital signal generated by circuit 2060 presented to logic inverter 2064 to generate signal 2068 as the logical inverse of signal 2066. Circuit 2060 is controlled 2062 by computer 2000. When digital signal 2066 is '0', the upper terminal of read current source 2080 is selected by Mux 2072 to drive signal r+, and the lower terminal of read current source 2080 is selected by Mux 2070 to drive signal r−. When digital signal 2066 is '1', the lower terminal of read current source 2080 is selected by Mux 2072 to drive signal r+, and the upper terminal of read current source 2080 is selected by Mux 2070 to drive signal r−.

As illustrated in FIG. 5, read current source 2080 is controlled 2094 by digital to analog interface 2090, which is driven 2092 by computer 2000.

The write current level onto write differential signal pair w+ and w− and the read current level onto read differential signal pair r+ and r− are maintained for at least a time period.

ESD protection circuit 2020 couples across the read differential signal pair r+ and r− protecting merged magnetoresistive read-write head 200 from ESD. Note that it is preferable with today's technology to use a dual diode circuit as shown herein, but ESD protection may be provided by other approaches, which may include integration of ESD protection into volt meter 2030 and/or read current source 2080.

Computer 2000 may provide a means for controlling at least one of the current source collection including read current source 2080 and write current source 2056. Alternatively, a finite state machine and/or a neural network may provide control to one or more of the current source collection members.

The means for inducing the temperature rise by applying current to the write head, creating a magnetic field across the read head and/or maintaining these conditions for a period of time may be performed at least in part by computer 2000, finite state machine and/or neural network.

These means implemented at least in part of computer 2000 may further be implemented as program steps of a program system 3000 residing in memory 2010 accessibly coupled 2002 with computer 2000.

For reasons of clarity of discourse, the finite state machine and neural network means implementations will not be discussed further. While it is preferred today to implement these means with computers, this discussion should not be construed as limiting the scope of the claims to just computers.

Figure 6A:
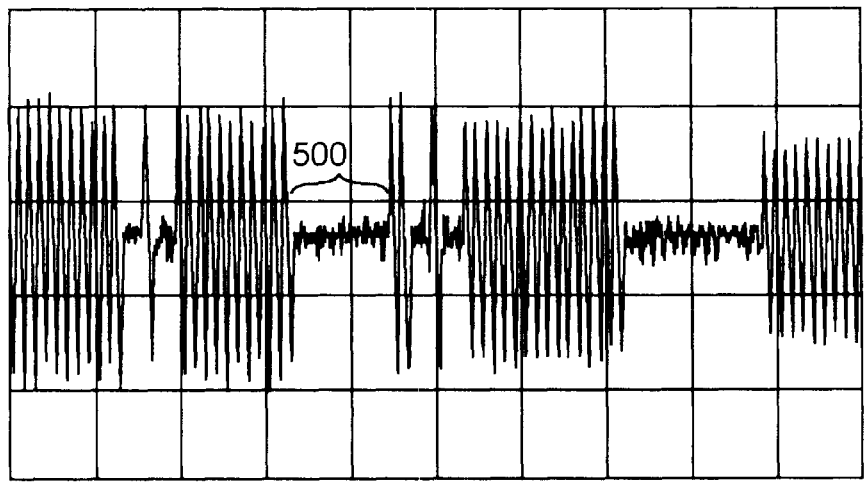
FIGS. 6A–6C illustrate laboratory results obtained showing the effect of unstable read-write heads causing base line popping in region 502 and the effect of repairs made with the invention removing base line popping in region 504.
Figure 6B:
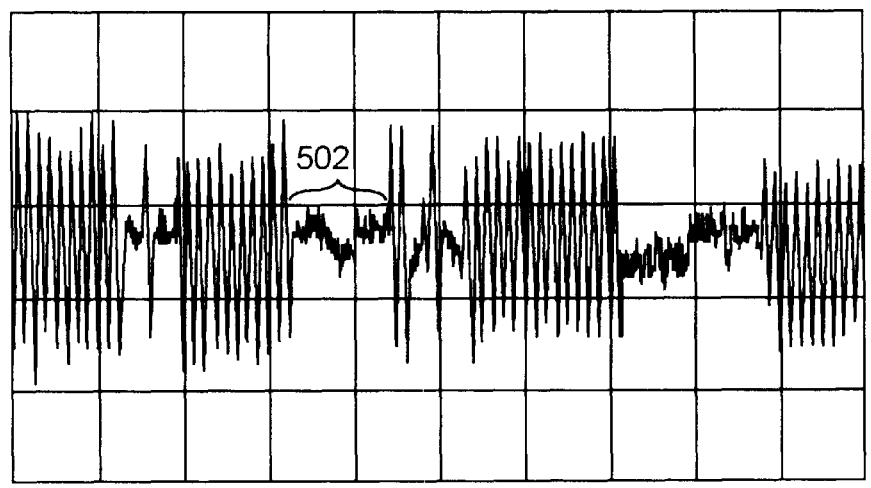
Figure 6C:
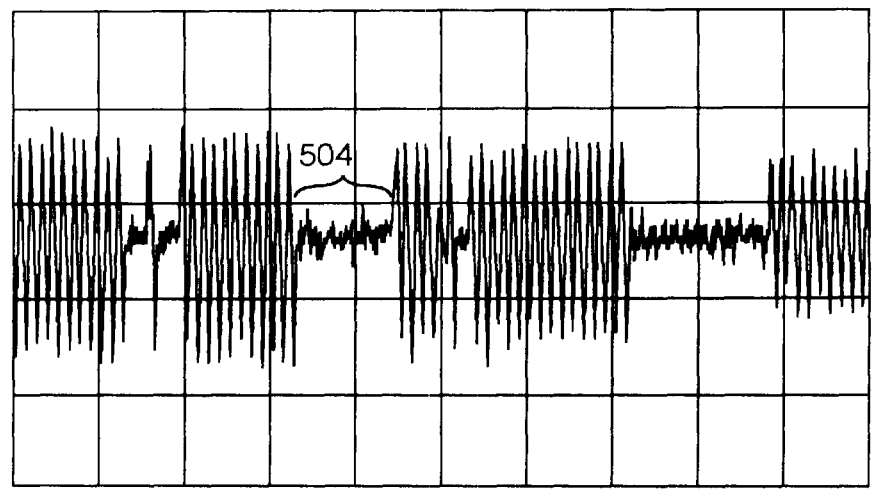

FIGS. 6A–6C illustrate laboratory results obtained showing the effect of unstable read-write heads causing base line popping in region 502 and the effect of repairs made with the invention removing base line popping in region 504.

Region 500 of FIG. 6A illustrates normal operation of a read head. Region 502 of FIG. 6B illustrates damaged operation of the read head after an unstable operation causes base line popping in that region. Region 504 of FIG. 6C illustrates operation of the previously unstable read head after repair. Note that the base line popping found in 502 is largely reduced in region 504, indicating the read head's magnetic domain is effectively repaired.

Figure 7A:
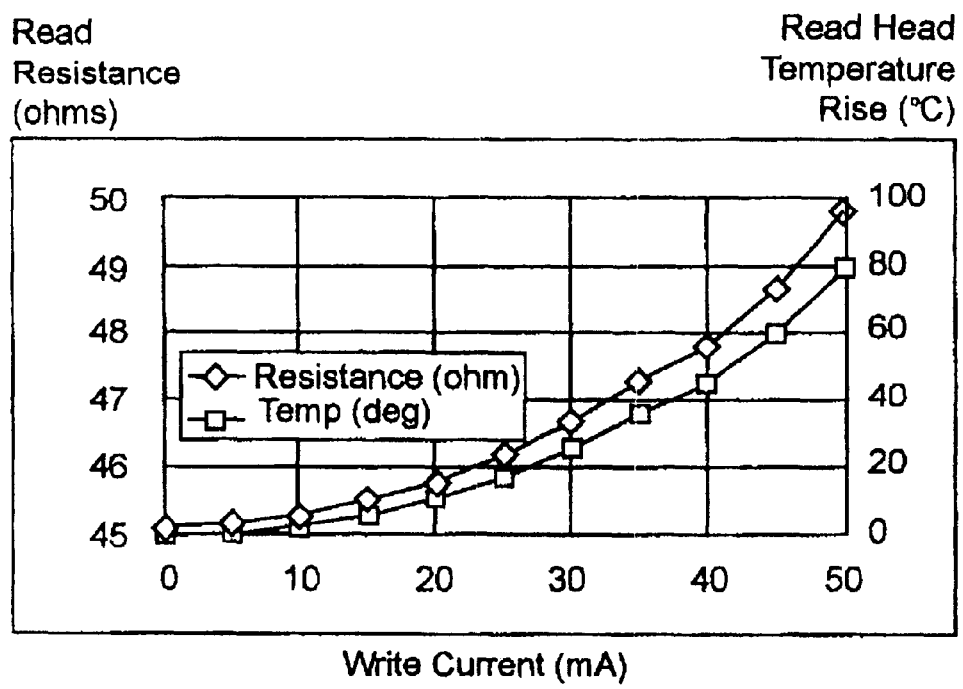
FIG. 7A illustrates the effect on resistance and temperature of a GMR read head (spin valve) with respect to the write current applied to the GMR write head.

FIG. 7A illustrates the effect on resistance and temperature of a GMR read head (spin valve) with respect to the write current applied to the GMR write head.

The bottom axis indicates the write current in milli-amps (mA). The left axis indicates read resistance in ohms. The right axis indicates temperature rise at the read head induced by the write current applied to the write head via the write differential signal pair. The temperature rise is indicated in degrees Celsius.

Note that the blocking temperature is between 200 to 300 degrees Celsius.

The diamond point path illustrates read-head resistance in terms of write current applied to the write head. The box point path illustrates the read head temperature rise induced by applying the write current level to the write head. Note that raising the read head temperature by about 100 degrees Celsius and the read current contributes another 100 to 150 degrees Celsius to pass the blocking temperature.

Figure 7B:
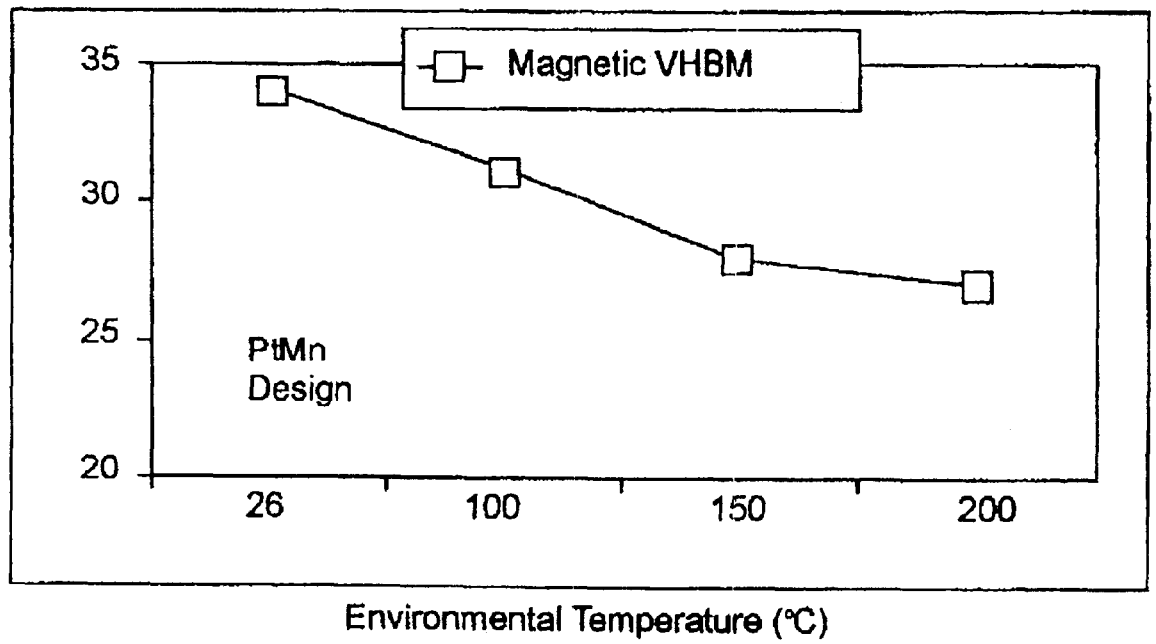
FIG. 7B illustrates that the resetting voltage based upon the Human Body Model decreases as the environmental temperature increases.

FIG. 7B illustrates that the resetting voltage based upon the Human Body Model decreases as the environmental temperature increases.

It should be noted that certain ESD events can at least partially reverse magnetization damage of the pinned layer. Such a reversal to shown horizontally as temperature in degrees Celsius and magnetic reversal voltage in the Human Body Model (VHBM) shown along the vertical axis.

Figure 8A:
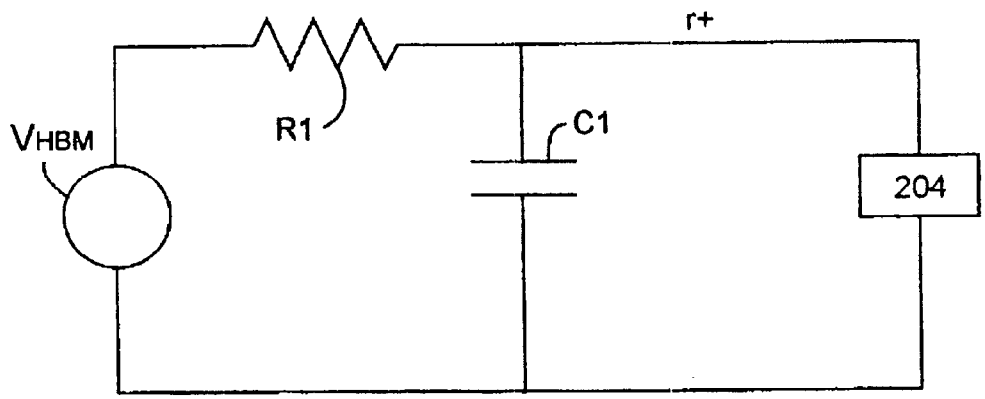
FIG. 8A illustrates the voltage model used in experimental determination of FIG. 7B.

FIG. 8A illustrates the voltage model used in experimental determination of FIG. 7B. VHBM is generated by a voltage source, R1 is an approximately 1.5 k ohm resistor and C1 is an approximately 100 pico-Farad capacitor.

One skilled in the art will recognize that FIG. 8A is greatly simplified, leaving silent ESD protection among other things. FIG. 8A has been included to show how the Human Body Model (HBM) voltage VHBM is experimentally used.

Figure 8B:
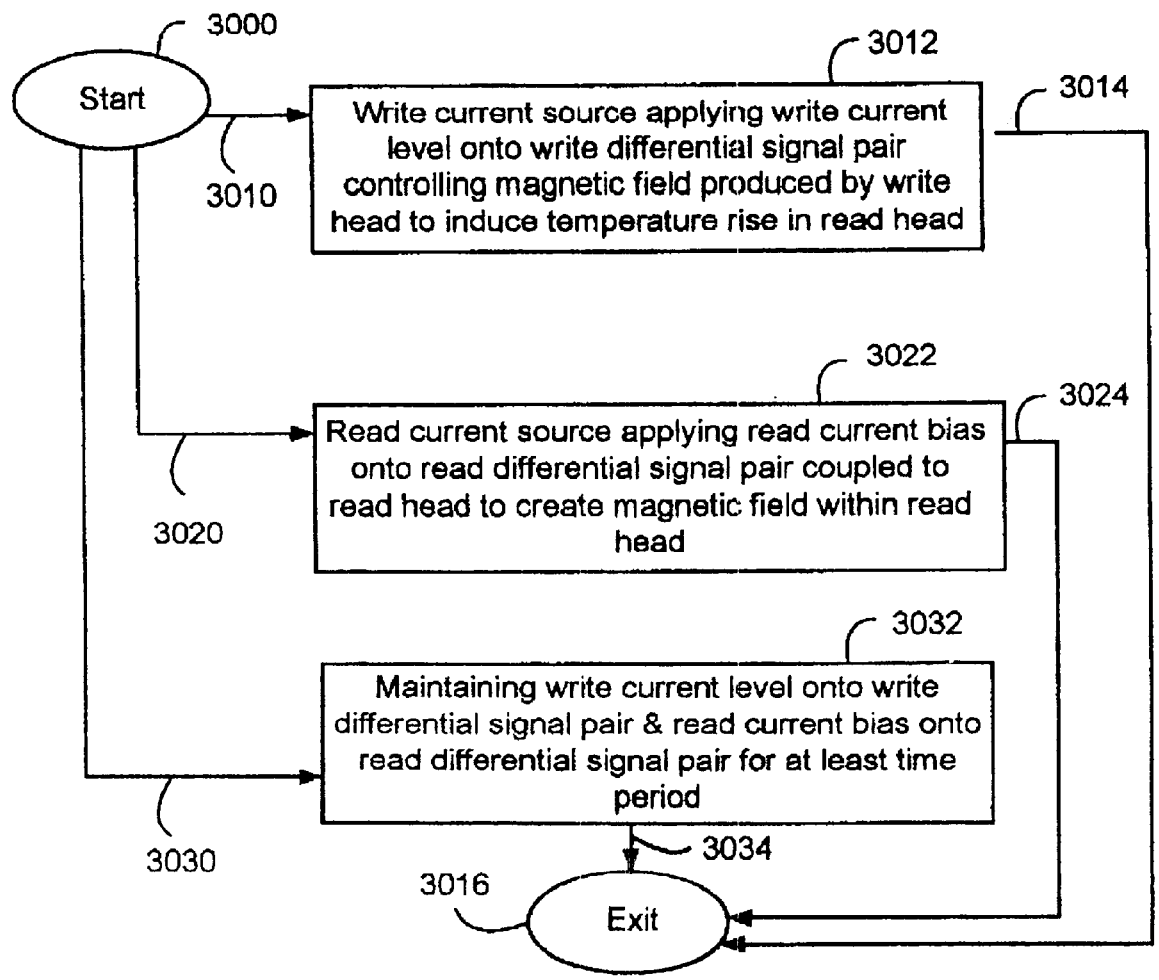
FIG. 8B illustrates a detail flowchart of program system 3000 of FIG. 5 for repairing the magnetic domain of a pin reversed state and/or unstable state of a merged magnetoresistive read-write head.

FIG. 8B illustrates a detail flowchart of program system 3000 of FIG. 5 for repairing the magnetic domain of a pin reversed state and/or unstable state of a merged magnetoresistive read-write head.

Note that this program system can also be part of an embedded disk drive controller program system 1128 thereby extending the program system to support this invention's method of repairing the read-write head 200.

Arrow 3010 directs the flow of execution from starting operation 3000 to operation 3012. Operation 3012 performs a write current source applying a write current level onto a write differential signal pair controlling a magnetic field produced by a write head to induce a temperature rise in a read head. Arrow 3014 directs execution from operation 3012 to operation 3016. Operation 3016 terminates the operations of this flowchart.

Arrow 3020 directs the flow of execution from starting operation 3000 to operation 3022. Operation 3022 performs a read current source applying a read current bias onto a read differential signal pair coupled to the read head to create a magnetic field within the read head. Arrow 3024 directs execution from operation 3022 to operation 3016. Operation 3016 terminates the operations of this flowchart.

Arrow 3030 directs the flow of execution from starting operation 3000 to operation 3032. Operation 3032 performs maintaining the write current level onto the write differential signal pair and the read current bias onto the read differential signal pair for at least a time period. Arrow 3034 directs execution from operation 3032 to operation 3016. Operation 3016 terminates the operations of this flowchart.

Note that operations 3012, 3022 and 3032 will be referred to as the repair step collection. Apparatus implementing steps 3012, 3022 and 3032 will be referred to as the repair means collection. These steps operated based upon a repair parameter collection. The repair parameter collection includes the write current level, the read current level and the time period the write current level and read current level are applied.

Figure 9:
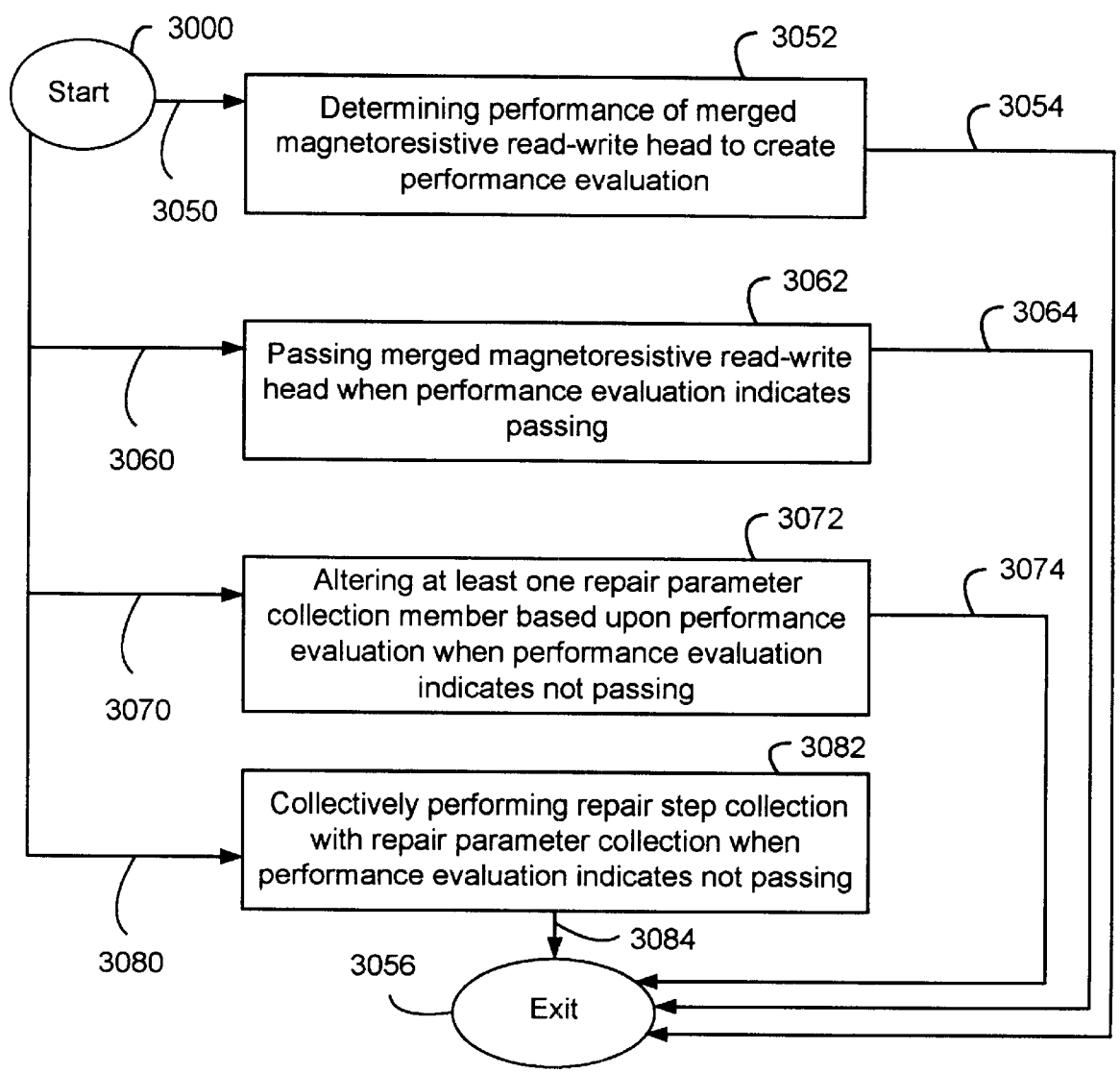
FIG. 9 illustrates a detail flowchart of operation 3000 of FIG. 5 for further repairing the read head.

FIG. 9 illustrates a detail flowchart of operation 3000 of FIG. 5 for further repairing the read head.

Arrow 3050 directs the flow of execution from starting operation 3000 to operation 3052. Operation 3052 determines performance of the merged magnetoresistive read-write head to create a performance evaluation. Arrow 3054 directs execution from operation 3052 to operation 3056. Operation 3056 terminates the operations of this flowchart.

Arrow 3060 directs the flow of execution from starting operation 3000 to operation 3062. Operation 3062 performs passing the merged magnetoresistive read-write head when the performance evaluation indicates passing. Arrow 3064 directs execution from operation is 3062 to operation 3056. Operation 3056 terminates the operations of this flowchart.

Arrow 3070 directs the flow of execution from starting operation 3000 to operation 3072. Operation 3072 performs altering at least one member of a repair parameter collection based upon the performance evaluation when the performance evaluation indicates not passing. Arrow 3074 directs execution from operation 3072 to operation 3056. Operation 3056 terminates the operations of this flowchart.

Arrow 3080 directs the flow of execution from starting operation 3000 to operation 3082. Operation 3082 performs collectively performing the repair step collection with the repair parameter collection when the performance evaluation indicates not passing. Arrow 3084 directs execution from operation 3082 to operation 3056. Operation 3056 terminates the operations of this flowchart.

Note that performance logs may be built with the performance evaluations and that an alteration direction may be determined from the performance log to guide altering the repair parameter collection members.

A repair parameter collection member may preferably be increased, possibly based upon guidance from the performance log taking into account the performance evaluation.

Any of the products including the read-write heads, head sliders, actuator arms, voice coil actuators and disk drives may use this method to repair pinned layer damage due to ESD events or magnetic domains of unstable read-write heads.

The preceding embodiments have been provided by way of example and are not meant to constrain the scope of the following claims.

What is claimed is:

1. An apparatus for repairing a merged magnetoresistive read-write head comprising a repair means collection including:

means for a write current source applying a write current level onto a write differential signal pair controlling a magnetic field produced by a write head contained in said merged magnetoresistive read-write head to induce a temperature rise in a read head contained in said merged magnetoresistive read-write head;

means for a read current source applying a read current bias onto a read differential signal pair coupled to said read head to create a magnetic field within said read head; and means for maintaining said write current level onto said write differential signal pair and said read current bias onto said read differential signal pair for at least a time period; and said apparatus further comprising:
   means for determining performance of said merged magnetoresistive read-write head to create a performance evaluation;

means for passing said merged magnetoresistive read-write head when said performance evaluation indicates passing;

means for altering at least one member of a repair parameter collection based upon said performance evaluation when said performance evaluation indicates not passing;

means for collectively operating said repair means collection with said repair parameter collection when said performance evaluation indicates not passing;
wherein said repair parameter collection is comprised of: said write current level, said read current level and said time period;
wherein said write current level induces said temperature rise at said read head of essentially one hundred degrees Celsius;
wherein said merged magnetoresistive read-write head is essentially free of an external magnetic influence; and
wherein said means for said write current and said means for said read current collectively induce said read head to pass a blocking temperature.

2. The apparatus of claim 1,
wherein said means for altering said repair parameter collection member is further comprised of:
means for increasing said repair parameter collection member.

3. The apparatus of claim 2, further comprising:
means for logging said performance evaluation with said repair parameter collection into a repair performance log.

4. The apparatus of claim 3,
wherein said means for increasing said repair parameter collection member is further comprised of:
means for reviewing said repair performance log to determine a repair direction; and
means for increasing said repair parameter collection member based upon said repair direction.

5. The apparatus of claim 1, further comprising:
means for detecting when said merged magnetoresistive read-write head contains a damaged pinned layer; and
means for collectively performing said repair step collection when said merged magnetoresistive read-write head contains said damaged pinned layer from an ESD event.

6. An apparatus making at least one member of a product collection including a head slider, an actuator arm, a voice coil actuator and a disk drive, comprising:
means for repairing at least one of said merged magnetoresistive read-write heads contained in said product collection member, using the apparatus of claim 1.

7. A disk drive, comprising the apparatus of claim 1 for repairing at least one of said merged magnetoresistive read-write heads contained in said disk drive.

8. The apparatus of claim 1,
wherein at least one of said means of claim 1 is comprised of at least one member of an implementation collection comprising:
a computer controlled by a program system containing at least one program step residing in a memory accessibly coupled to said computer is controllably coupled to at least one member of a current source collection comprising said read current source and said write current source;
a finite state machine controllably coupled to at least one member of said current source collection; and
a neural network controllably coupled to at least one member of said current source collection;
wherein said implementation collection member implements at least part of said means.

9. A method of repairing a read head in a merged magnetoresistive read-write head comprising a repair step collection including the steps of:
a write current source and a read current source collectively induce said read head to pass a blocking temperature, further comprising the steps of:
said write current source applying a write current level onto a write differential signal pair controlling a magnetic field produced by a write head to induce a temperature rise in a read head;
said read current source applying a read current bias onto a read differential signal pair coupled to said read head to create a magnetic field within said read head;
maintaining said write current level onto said write differential signal pair and said read current bias onto said read differential signal pair for at least a time period;
wherein said merged magnetoresistive read-write head is essentially free of an external magnetic influence.

10. The method of claim 9, further comprising the steps of:
determining performance of said merged magnetoresistive read-write head to create a performance evaluation;
passing said merged magnetoresistive read-write head when said performance evaluation indicates passing;
altering at least one member of a repair parameter collection based upon said performance evaluation when said performance evaluation indicates not passing;
collectively performing the repair step collection with said repair parameter collection when said performance evaluation indicates not passing;
wherein said repair parameter collection is comprised of said write current level, said read current level, and said time period.

11. The method of claim 10,
wherein the step altering said repair parameter collection member is further comprised of the step of:
increasing said repair parameter collection member.

12. The method of claim 11, further comprising the step of:
logging said performance evaluation with said repair parameter collection into a repair performance log.

13. The method of claim 12,
wherein the step increasing said repair parameter collection member is further comprised of the steps of:
reviewing said repair performance log to determine a repair direction; and
increasing said repair parameter collection member based upon said repair direction.

14. The method of claim 9, further comprising the steps of:
detecting when said merged magnetoresistive read-write head contains a damaged pinned layer;
collectively performing said repair step collection when said merged magnetoresistive read-write head contains said damaged pinned layer from an ESD event.

15. The method of claim 14,
wherein said write current source applying said write current level induces said temperature rise at said read head of essentially one hundred degrees Celsius.

16. The method of claim 15,
wherein said write current level is approximately at least 50 mA DC.

17. A method of making said merged magnetoresistive read-write head, comprising the steps of the method of repairing said merged magnetoresistive read-write head of claim 9.

18. Said merged magnetoresistive read-write head as the product of claim 17.

19. A method of making a head slider, comprising the steps of:
using at least one merged magnetoresistive read-write head to create said head slider; and repairing at least one of said merged magnetoresistive read-write heads contained in said head slider, using the method of claim 9.

20. Said head slider as the product of the method of claim 19.

21. A method of making an actuator arm, comprising the steps of:
using at least one head slider containing at least one merged magnetoresistive read-write head to create said actuator arm; and
repairing at least one of said merged magnetoresistive read-write heads contained in said actuator arm, using the method of claim 9.

22. Said actuator arm as the product of the method of claim 21.

23. A method of making a voice coil actuator, comprising the steps of:
using at least one said actuator arm containing at least one merged magnetoresistive read-write head to create said voice coil actuator; and
repairing at least one of said merged magnetoresistive read-write heads contained in said voice coil actuator, using the method of claim 9.

24. Said voice coil actuator as the product of the method of claim 23.

25. A method of making a disk drive, comprising the steps of:
using at least one said voice coil actuator containing at least one merged magnetoresistive read-write head to create said disk drive; and
repairing at least one of said merged magnetoresistive read-write heads contained in said disk drive, using the method of claim 9.

26. Said disk drive as the product of the method of claim 25.

27. A program system implementing said method of claim 9, comprising program steps implementing the steps of said method residing in a memory accessibly coupled to a computer to repair said merged magnetoresistive read-write heads.

28. The program system of claim 27,
wherein said computer at least partially controls a test system testing at least one member of the collection comprising:
at least one of said merged magnetoresistive read-write heads,
a head slider containing at least one of said merged magnetoresistive read-write heads,
an actuator arm containing at least one of said merged magnetoresistive read-write heads, and
a voice coil actuator containing at least one of said merged magnetoresistive read-write heads.

29. The program system of claim 27,
wherein said computer at least partially controls a disk drive containing at least one of said merged magnetoresistive read-write heads.

\* \* \* \* \*